(12) United States Patent
Choi et al.

(10) Patent No.: US 7,178,156 B2
(45) Date of Patent: Feb. 13, 2007

(54) DISK CARTRIDGE HAVING IDENTIFICATION ELEMENT AND DISK DRIVE APPARATUS WHICH RECOGNIZES THE IDENTIFICATION ELEMENT

(75) Inventors: Han-kook Choi, Gyeonggi-do (KR); Sun-mo Kim, Seoul (KR); Yong-hoon Lee, Gyeonggi-do (KR); Chong-sam Chung, Gyeonggi-do (KR); Seok-jung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/240,452

(22) Filed: Oct. 3, 2005

(65) Prior Publication Data

US 2006/0064714 A1    Mar. 23, 2006

Related U.S. Application Data

(62) Division of application No. 10/272,283, filed on Oct. 17, 2002, now Pat. No. 7,043,744.

(30) Foreign Application Priority Data

Oct. 17, 2001    (KR) .............................. 2001-63951

(51) Int. Cl.
*G11B 23/03* (2006.01)
(52) U.S. Cl. ..................................... 720/729
(58) Field of Classification Search .................... None
See application file for complete search history.

(56) References Cited

U.S. PATENT DOCUMENTS

| 4,995,029 | A | 2/1991 | Kobayashi et al. ......... 369/291 |
| 5,638,228 | A | 6/1997 | Thomas, III ................. 360/60 |
| 5,886,961 | A | 3/1999 | Yamashita et al. ......... 369/30.3 |
| 6,239,950 | B1 | 5/2001 | Uwabo et al. ............... 360/133 |
| 6,412,991 | B1 | 7/2002 | Klinefelter et al. ......... 400/240 |
| 6,724,705 | B1 | 4/2004 | Ko et al. .................. 369/53.21 |
| 2002/0097657 | A1 | 7/2002 | Seo et al. .................. 369/77.1 |

FOREIGN PATENT DOCUMENTS

| EP | 1229540 | 8/2002 |
| JP | 59-151365 | 8/1984 |
| JP | 60-64484 | 5/1985 |
| JP | 61-87288 | 5/1986 |
| JP | 61-137275 | 6/1986 |
| JP | 61-283087 | 12/1986 |
| JP | 61283087 A | * 12/1986 |

(Continued)

*Primary Examiner*—David Davis
(74) *Attorney, Agent, or Firm*—Stein, McEwen & Bui, LLP (57) ABSTRACT

A disk cartridge has a reflection portion to identify a kind of a disk in the disk cartridge. A disk drive apparatus has an optical detector to identify the kind of the disk by irradiating a beam to the reflection portion and detecting the reflected beam. The disk cartridge and the disk drive apparatus provide identification marks for identifying the kind of the disk by varying the angle and amount of a beam reflected from the reflection portions on the disk cartridge. Therefore, the kind of a disk and the type of a disk format are identified as well as the storage capacity of the disk.

17 Claims, 10 Drawing Sheets

FOREIGN PATENT DOCUMENTS

| | | |
|---|---|---|
| JP | 02-192069 | 7/1990 |
| JP | 04-60978 | 2/1992 |
| JP | 04061650 A * | 2/1992 |
| JP | 05-325297 | 12/1993 |
| JP | 06-28735 | 2/1994 |
| JP | 07-121952 | 5/1995 |
| JP | 08-335361 | 12/1996 |
| JP | 08-339658 | 12/1996 |
| JP | 09-204682 | 8/1997 |
| JP | 09237483 A * | 9/1997 |
| JP | 10-106127 | 4/1998 |
| JP | 11-16213 | 1/1999 |
| JP | 11-120733 | 4/1999 |
| JP | 11-120736 | 4/1999 |
| JP | 2000030406 A * | 1/2000 |
| TW | 452770 | 9/2001 |

* cited by examiner

DISK CARTRIDGE HAVING IDENTIFICATION ELEMENT AND DISK DRIVE APPARATUS WHICH RECOGNIZES THE IDENTIFICATION ELEMENT

CROSS-REFERENCE TO RELATED APPLICATION

This application is a divisional application of U.S. patent application Ser. No. 10/272,283, filed Oct. 17, 2002 now U.S. Pat. No. 7,043,744, which claims the benefit of Korean Application No. 2001-63951, filed Oct. 17, 2001 in the Korean Intellectual Property Office, the disclosures of which are incorporated herein in their entirety by reference.

BACKGROUND OF THE INVENTION

1. Field of the Invention

The present invention relates to a disk cartridge for receiving an information recording and/or reproducing medium such as a disk and a disk drive apparatus for recording and/or reproducing information on/from the disk, and more particularly, to a disk cartridge and disk drive apparatus having an improved identification device which identifies the kind of disk in the disk cartridge.

2. Description of the Related Art

Recently, disk cartridges, which receive recording and/or reproducing media such as optical disks or magneto-optical disks to be used in a disk drive, are widely used as recording and/or reproducing apparatuses which reproduce images and sound data. Various types of disk cartridges with improved recording density have been manufactured according to development of multimedia and requirements for disk cartridges having a large capacity. For example, various types of disk cartridges for DVD-RAM are provided with different recording densities. Examples of the disk cartridges include an ordinary single-sided disk for recording information on one side of the disk, a double-sided disk for recording information on the front and rear sides of the disk, a single-sided disk with double recording layers for constituting a two-fold recording layer on one side to record information on each layer, a double-sided disk with double recording layers for applying the single-sided disk with double recording layers to the front and rear sides, and a single-sided disk having narrow track pitches.

As the recording density changes, the methods for recording and reproduction used in a disk drive apparatus also change. For example, the methods for recording and reproducing information in the disk drive apparatus vary according to the formation of track pitches and recording layers on the disk. Consequently, a structure for identifying the types of the disk cartridges when the disk cartridges are mounted in the disk drive is required.

Figure 1:
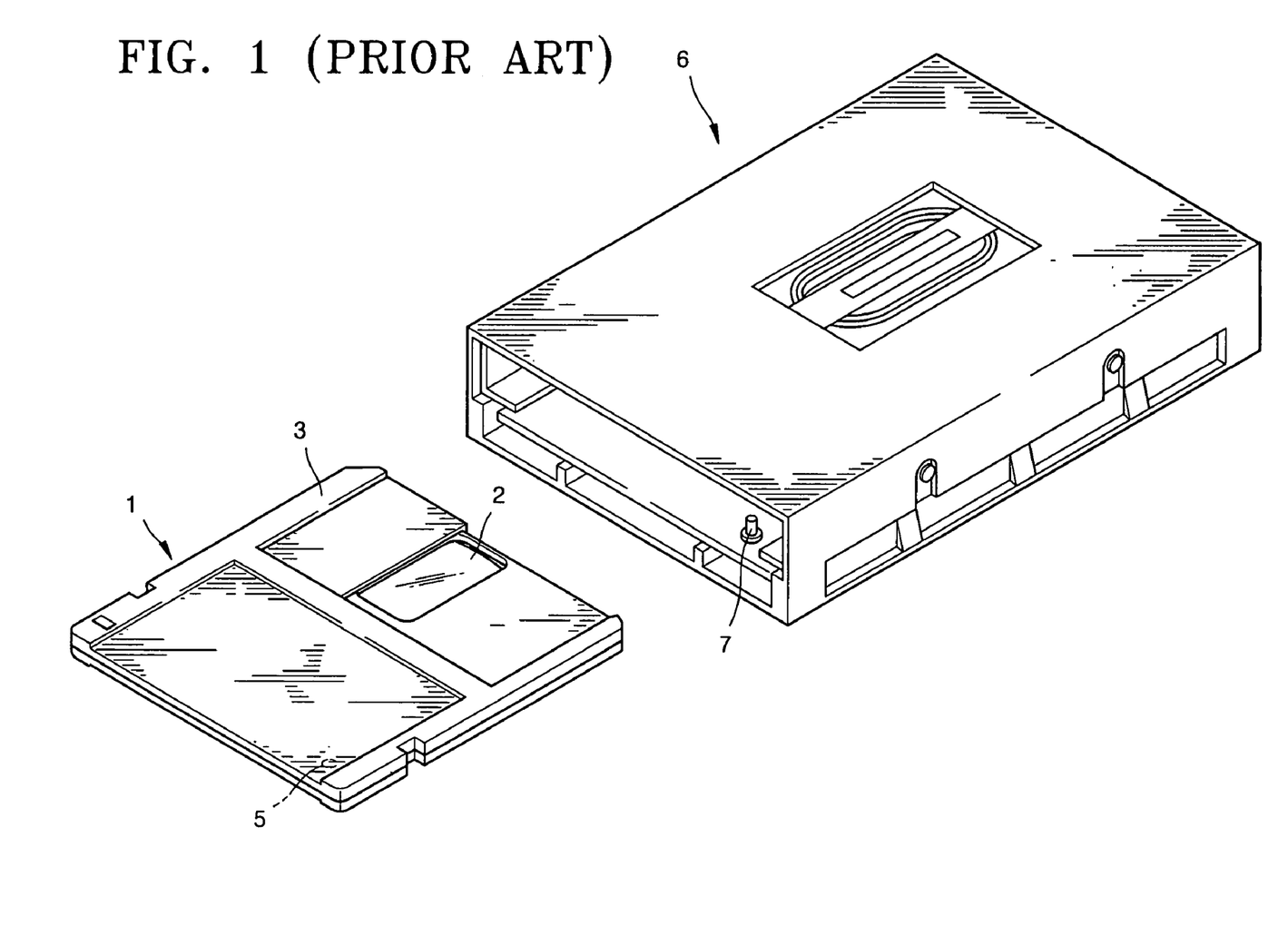
FIG. 1 is a perspective view illustrating a disk cartridge and disk drive apparatus having a conventional disk identification device.

A conventional structure for identifying the types of the disks, shown in FIG. 1, is disclosed in Japanese Patent Publication No. 11-120733. Referring to FIG. 1, an identification magnet 5, which is used to identify the disk type, is installed on a disk cartridge 1 which receives a disk 2 in a case 3. A magnetic sensor 7 is installed in a disk drive apparatus 6 to detect the identification magnet 5. When the disk cartridge 1 is mounted in the disk drive apparatus 6, the magnetic sensor 7 detects the magnetic field of the identification magnet 5 to determine the kind of the disk cartridge 1, which is shown as a large capacity disk cartridge. The magnetic sensor 7 transfers the result to a controller (not shown) of the disk drive apparatus 6 to perform an operation according to the kind of the disk cartridge. The identification magnet 5 is not installed on a small capacity disk cartridge. In this case, the magnetic field is not detected by the magnetic sensor 7 when the small capacity disk cartridge is mounted in the disk drive apparatus 6, thereby the kind of the mounted disk cartridge is identified as a small capacity disk cartridge. Thus, the conventional method identifies the kind of the disk cartridges by setting the magnetic sensor 7 on/off according to the existence of the identification magnet 5. Consequently, the conventional method identifies only two kinds of the disk cartridges such as large capacity and small capacity cartridges.

When the conventional method is used to identify various kinds of disk cartridges, the number of magnets 5 is varied according to the number of the kinds of disk cartridges. A plurality of the magnetic sensors 7 are installed to detect the maximum number of installed magnets 5. The kinds of disk cartridges are thus identified based on the number of the magnetic sensors 7.

According to another method, the magnetic field of the magnet 5 is varied according to the kinds of the disk cartridges. However, this requires a delicate circuit in the magnetic sensor 7 to distinguish the intensity of the magnetic field of the identification magnet 5.

However, increasing the numbers of the magnets and the magnetic sensors leads to an increase in the size and weight of a disk drive along with an increase in the manufacturing and production costs. Also, by varying the intensity of the magnetic field of the identification magnet, in addition to the need for a delicate identifying circuit, as the magnetic field deteriorates, the magnet cause an erroneous identification of the kinds of the disk cartridges. As a result, novel and simple structures for disk cartridges and disk drive apparatuses to identify various kinds of disk cartridges are required.

SUMMARY OF THE INVENTION

To solve the above and other problems, it is an object of the present invention to provide a disk cartridge and a disk drive apparatus to identify by a simple structure various kinds of disk cartridges.

Additional objects and advantages of the invention will be set forth in part in the description which follows and, in part, will be obvious from the description, or may be learned by practice of the invention.

To accomplish the above and other objects of the present invention, an embodiment of the invention includes disk cartridge for use with a disk as an information recording medium and a case for receiving the disk, where the case includes reflection portions that reflect an incident beam to a predetermined optical detector to identify a disk type using a characteristic of the reflected beam.

According to another embodiment of the present invention, a disk drive apparatus comprises a recording and/or reproducing unit for recording and/or reproducing information on/from a disk in a disk cartridge, and an optical detector to irradiate a beam on a reflection portion on the disk cartridge and to detect the reflected beam so as to identify a disk type.

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIGS. 2 through 5 illustrate a disk cartridge 10 and disk drive apparatus 100 having a disk identification device according to an embodiment of the present invention. The disk cartridge 10 receives a disk 12, as an information recording and/or reproducing medium, in a case 11. The disk cartridge 10 has reflection portions 13 on upper and lower surfaces thereof to reflect a beam incident from a predetermined light source. The shown reflection portions 13 are constructed so as to identify the kind of the disk 12 in the disk cartridge 10 by attaching or printing a label that reflects the beam, coating a reflection film formed of aluminum or other reflective material, or by any other mechanism by which a reflective area is formed on a surface.

Figure 3:
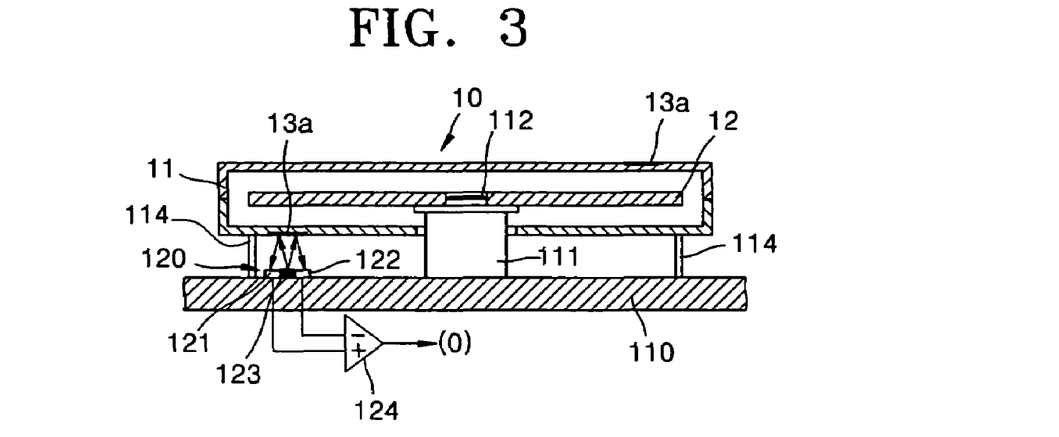
FIGS. 3 through 5 are cross-sectional views illustrating examples of the disk identification device of FIG. 2.
Figure 4:
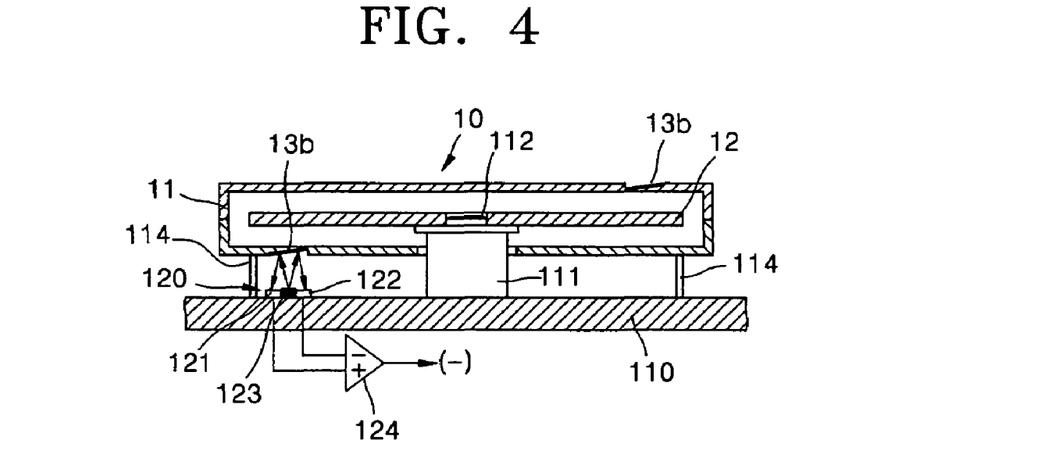
Figure 5:
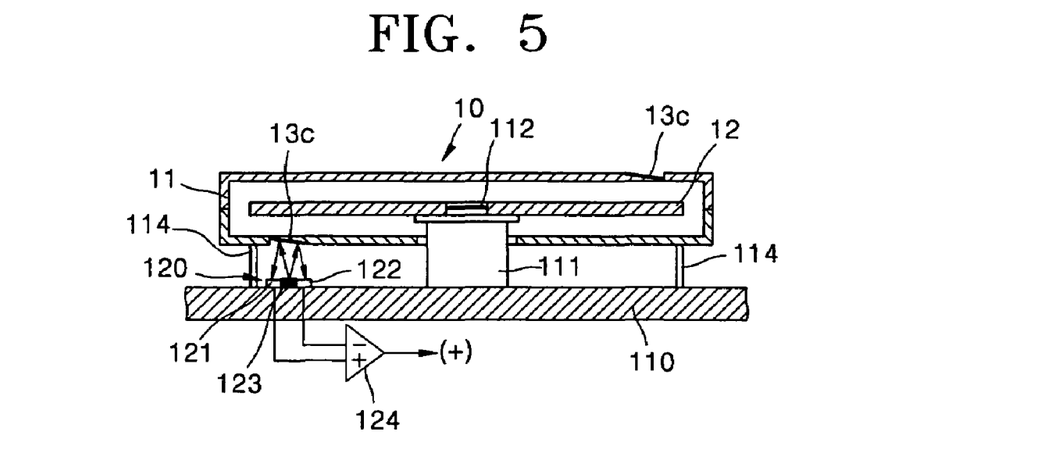
Figure 6:
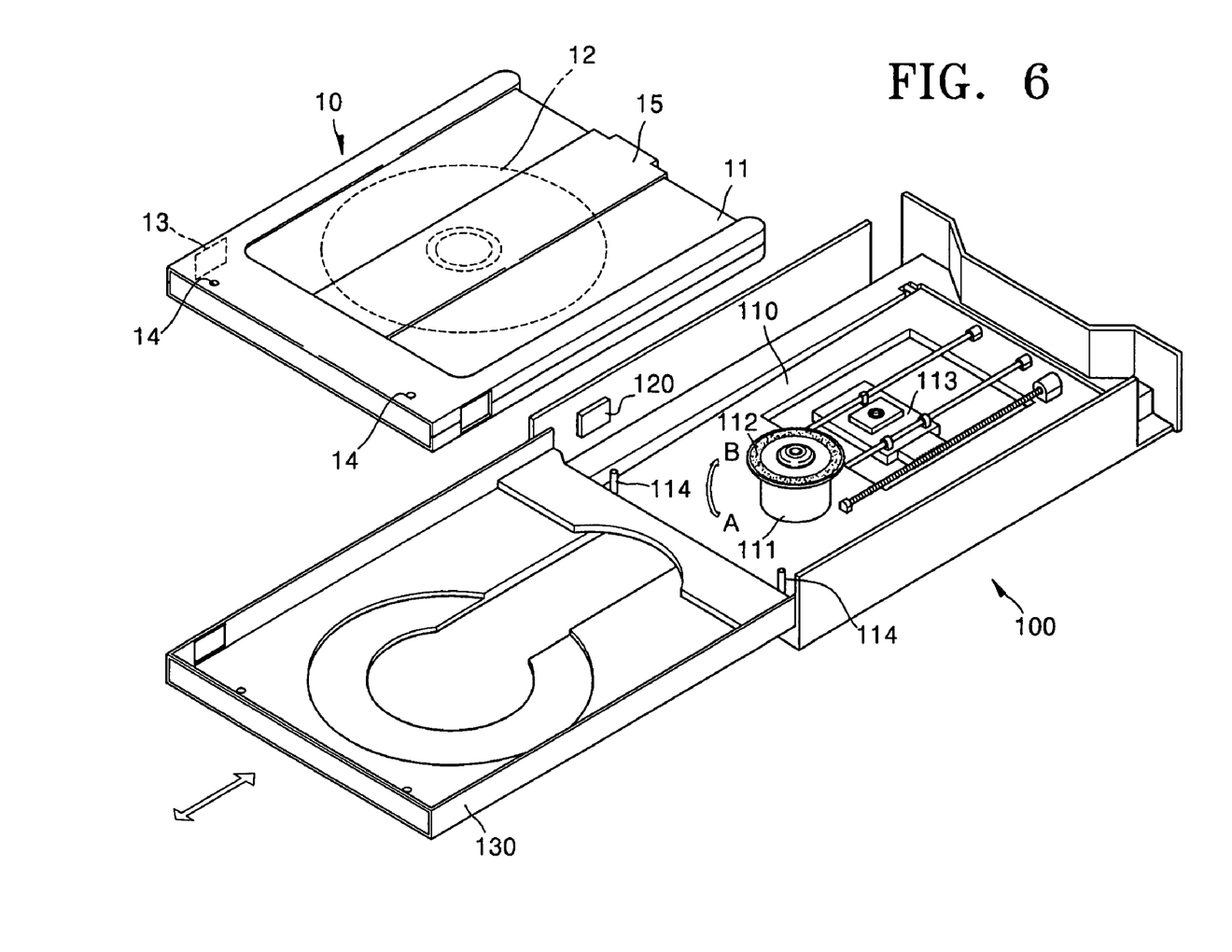
FIG. 6 is a perspective view illustrating a disk cartridge and disk drive apparatus having a disk identification device according to another embodiment of the present invention.

The angle of the reflection portions 13 varies according to the kind of the disk 12. In other words, the reflection portions 13 may be parallel with a horizontal surface of the case 11 as shown in FIG. 3, or the reflection portions 13 may be inclined by predetermined angles as shown in FIGS. 4 and 5. Since the reflected beam changes according to a change in the reflection angle of the beam, the disk type can be identified by detecting a change in the optical properties of the reflected beam. The disk cartridge 10 further includes holes 14 into which pins 114 of the disk drive apparatus 100 are inserted, and an opening/closing shutter 15.

Figure 2:
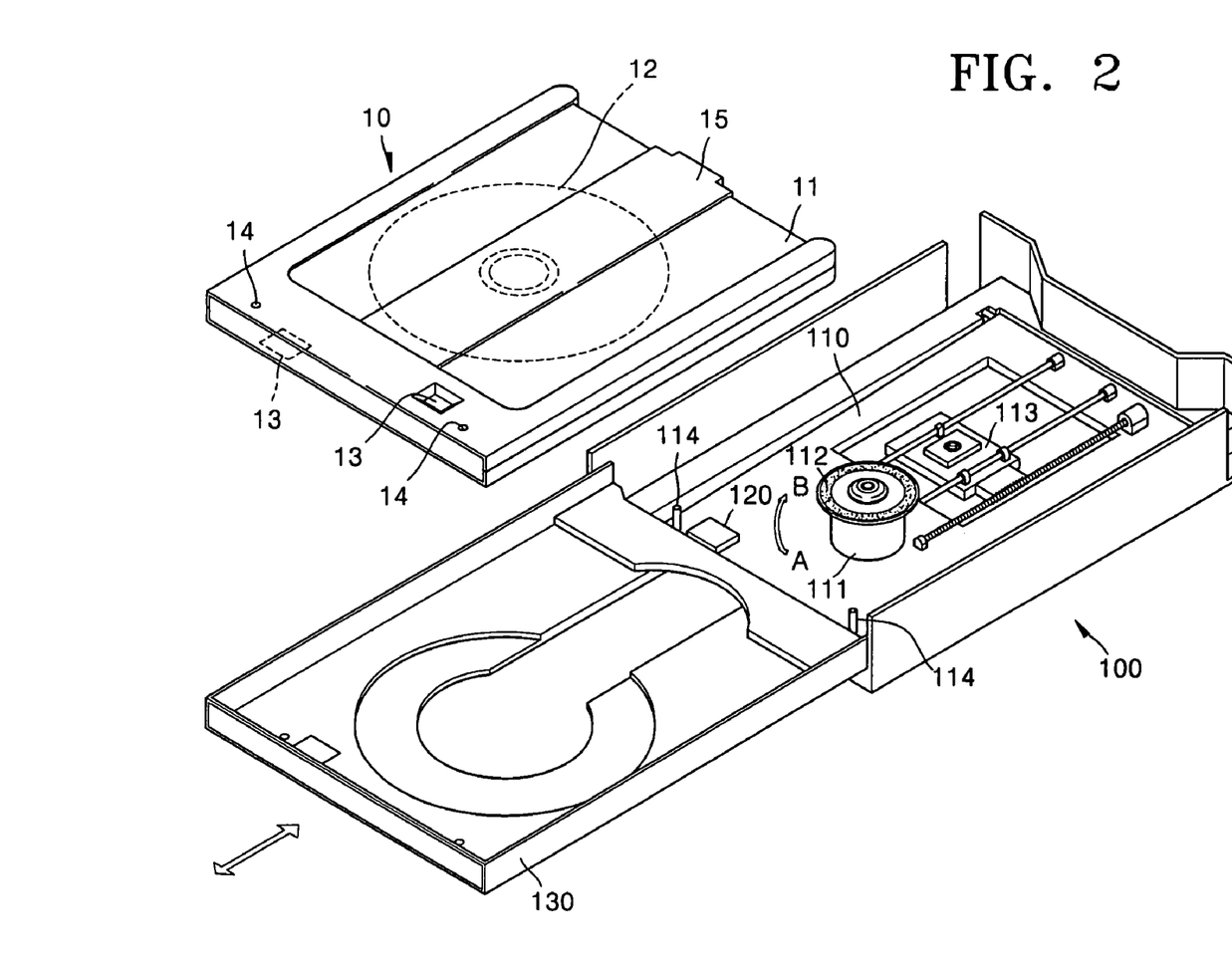
FIG. 2 is a perspective view illustrating a disk cartridge and disk drive apparatus having a disk identification device according to an embodiment of the present invention.

The above-described disk cartridge 10 is mounted on a tray 130 and inserted into the disk drive apparatus 100. The disk drive apparatus 100 has a rotation chassis 110 which is rotated in A direction and B direction by a predetermined cam (not shown). The rotation chassis 110 includes a turntable 112 on which the disk 12 is mounted, a spindle motor 111 for rotating the turntable 112, and a recording and/or reproducing unit having an optical pickup 113 for recording and/or reproducing information on/from the disk 12. The rotation chassis 110 includes an optical detector 120 to irradiate a beam to the reflection portions 13 and to detect the reflected beam thereof to identify the kind of the disk 12. When the tray 130 is ejected from the disk drive apparatus 100 as shown in FIG. 2, the rotation chassis 110 is lowered by rotating in the A direction. When the tray 130 is inserted into the disk drive apparatus 100, the rotation chassis 110 is raised by rotating in the B direction to mount the disk 12 of the disk cartridge 10 on the turntable 112 while inserting the pins 114 into the holes 14. While shown as having elements such as the tray 130 and pins 114 for use in positioning and mounting the disk cartridge 10, it is understood that the disk drive apparatus 100 need not include these elements in all aspects of the invention.

When the disk cartridge 10 is mounted in the disk drive apparatus 100, the optical detector 120 is located beneath the reflection portions 13a, 13b, and 13c as shown in FIGS. 3 through 5. In the shown example, the optical detector 120 is a light emitting diode (LED) 123, and first and second photo detectors 121 and 122 symmetrically located with respect to the LED 123. Signals detected by the first and second photo detectors 121 and 122 are summed up in a differential amplifier 124 and output as a predetermined result. However, other types of light emitter-detector arrangements can be used in which the detector portion detects changes in optical characteristics of a reflected light beam.

The procedure for the identification of the disk types by using the reflection portions 13 and the optical detector 120 will now be described. When the disk cartridge 10 is mounted on the tray 130 and inserted into the disk drive apparatus 100, the rotation chassis 110 is raised by rotating in the B direction to mount the disk 12 on the turntable 112. At this point, the optical detector 120 is located vertically adjacent the reflection portion 13.

When the reflection portions 13a are parallel with the horizontal surface of the case 11 as shown in FIG. 3, the LED 123 irradiates the beam toward the reflection portion 13a and the beam is symmetrically reflected from the reflection portion 13a to the first and second photo detectors 121 and 122. The first and second photo detectors 121 and 122 respectively receive roughly the same amount of reflected beam, and the differential amplifier 124 outputs zero for the summed result. According to the summed result, the disk drive apparatus 100 identifies the disk 12 in the disk cartridge 10, which is mounted in the disk drive apparatus 100, as an A-type disk, which is identified by having the horizontal reflection portions 13a for an identification mark.

When the disk cartridge 10 has the reflection portions 13b that are inclined toward the right side as shown in FIG. 4, the beam irradiated from the LED 123 is reflected to the first and second photo detectors 121 and 122, with the second photo detector 122 receiving a larger amount of the reflected beam. The differential amplifier 124 outputs a negative value for the summed result. Based upon the summed result, the disk drive apparatus 100 identifies the disk cartridge 10, which is mounted in the disk drive apparatus 100, as a B-type disk, which is identified by having the reflection portions 13b inclined toward the right side for the identification mark.

When the disk cartridge 10 has the reflection portions 13c that are inclined toward the left side as shown in FIG. 5, when the beam irradiated from the LED 123 is reflected to the first and second photo detectors 121 and 122, the first photo detector 122 receives a larger amount of the reflected beam. Accordingly, the differential amplifier 124 outputs a positive value for the summed up result. According to the summed result, the disk drive apparatus 100 identifies the disk cartridge 10, mounted in the disk drive apparatus 100, as a C-type disk, which is identified by having the reflection portions 13c inclined toward the left side for the identification mark.

Since the inclination of the reflection portions 13 varies for changing the reflection angle, the differential amplifier 124 outputs different results. Since each reflection angle corresponds to a disk type, the reflection portions 13 sufficiently operate as the identification mark to identify the disk types. While shown in terms of three settings to identify three disk types, it is understood that additional angles could be utilized as well as additional photodetectors to identify additional disk types.

In addition, by changing the amount of the beam reflected from the reflection portions 13, a larger number of combinations can be formed. For instance, if the color of the reflection portions 13 is changed, the amount of the reflected beam varies without changing the reflection angle. Accordingly, since a plurality of values are output from the differential amplifier 124, the disk types are identified based on the scale of the output value. In case of the horizontal reflection portions 13a of FIG. 3, since the differential amplifier 124 outputs zero regardless of a change in the amount of the reflected beam, the method for changing the color of the reflection portions 13 using a difference in light intensity is not applicable to the horizontal reflection portions 13a of FIG. 3. However, it is understood that additional light detection schemes can be used in order to detect a change in light intensity due to color where the reflection is from the horizontal reflection portion 13a.

In order to vary the amount of the reflected beam, the material or area of the reflection portions 13 may be changed as well as the color of the reflection portions 13. As a result, the reflection portions 13 may operate as the identification mark by changing the amount of the reflected beam. In particular, to identify various kinds of the disks, when the method for changing the amount of the reflected beam is combined with the method for varying the reflection angle, the number of values output from the differential amplifier 124 increases. Similar results can also occur by altering other optical properties, such as changes in wavelength phase using wavelength plates or diffracting the light using diffractive gratings.

In the embodiment shown in FIGS. 2 through 5, the reflection portions 13 are installed on the upper and lower surfaces of the case 11 since the disk 12 in the disk cartridge 10 is a double-sided disk. Accordingly, the optical detector 120 identifies the kind of the disk 12 regardless of the inserted state of the disk cartridge 10. If the disk cartridge 10 was instead for a single-sided disk, when the disk cartridge 10 is inserted into a disk drive apparatus 100 (shown in FIGS. 6 through 9) in a reverse state, the reflection portion is not on the bottom side of the disk cartridge and is thus not detected, which causes an error message to be generated. Therefore, a user may recognize that the disk cartridge 10 is inserted into the disk drive apparatus 100 (shown in FIGS. 6 through 9) in the reverse state.

FIGS. 6 through 9 illustrate the disk cartridge 10 and the disk drive apparatus 100 having a disk identification device according to another embodiment of the present invention. The same reference numerals in FIGS. 6 through 9 denote the same components used in the embodiment. The general construction of the disk cartridge 10 and the disk drive apparatus 100 according to the embodiment shown in FIGS. 6 through 9 are the same as those presented in the embodiment shown in FIGS. 2 through 5, except that reflection portions 13d, 13e, and 13f, and an optical detector 120 are respectively installed on sides of a disk cartridge 10 and a disk drive apparatus 100.

Figure 7:
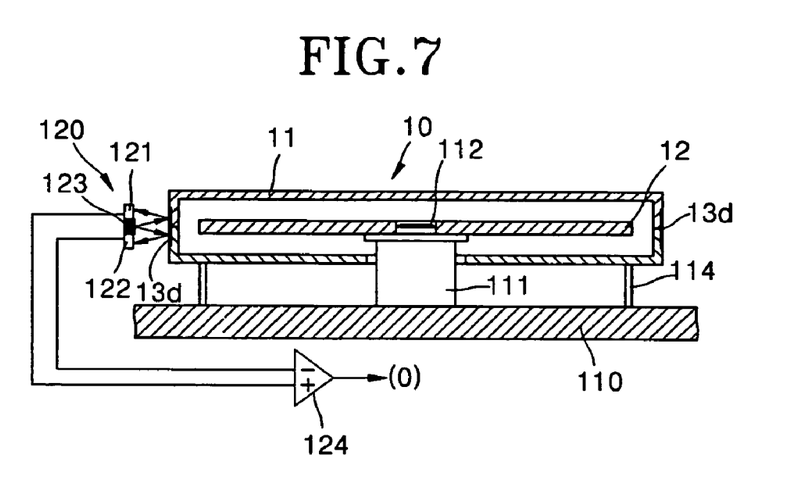
FIGS. 7 through 9 are cross-sectional views illustrating examples of the disk identification device of FIG. 6.

When the disk cartridge 10 is mounted on the tray 130 and is inserted into the disk drive apparatus 100, the rotation chassis 110 is raised by rotating in a B direction to mount the disk 12 on the turntable 112. In this case, the optical detector 120 is located horizontally adjacent the reflection portion 13. When the reflection portions 13d are formed in a parallel direction as shown in FIG. 7, the beam irradiated from the LED 123 toward the reflection portion 13d is symmetrically reflected to the first and second photo detectors 121 and 122. The differential amplifier 124 outputs zero for a summed result. According to the summed result, the disk drive apparatus 100 identifies the disk 12 in the disk cartridge 10, which is mounted in the disk drive apparatus 100, as an A-type disk, which is indicated by having the horizontal reflection portions 13d for an identification mark.

Figure 8:
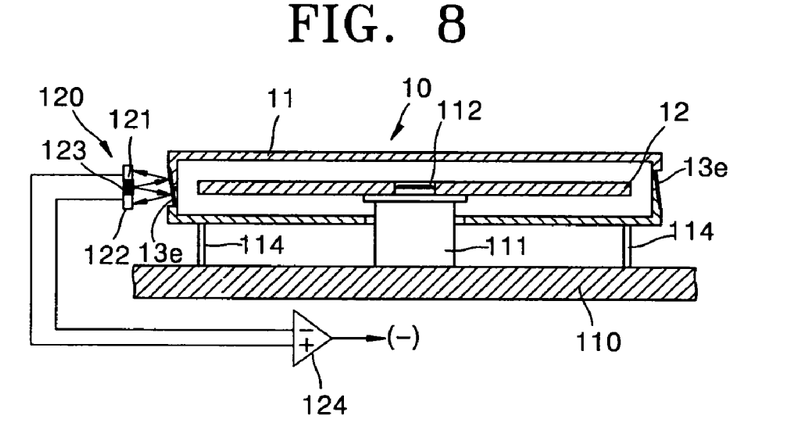

When the disk cartridge 10 has the reflection portions 13e that are inclined toward the right side as shown in FIG. 8, the beam irradiated from the LED 123 is reflected to the first and second photo detectors 121 and 122, with the second photo detector 122 receiving a larger amount of the reflected beam. The differential amplifier 124 outputs a negative value for the summed result. Based upon the summed result, the disk drive apparatus 100 identifies the disk cartridge 10, which is mounted in the disk drive apparatus 100, as a B-type disk, which is identified by having the reflection portions 13b inclined toward the right side for the identification mark.

Figure 9:
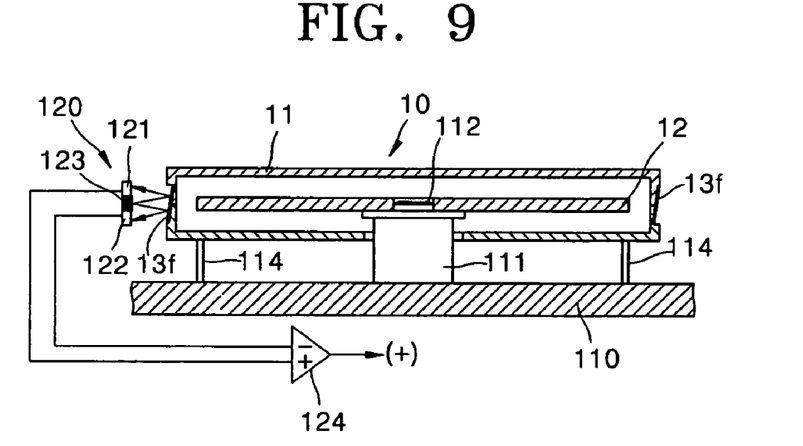

When the disk cartridge 10 has the reflection portions 13f that are inclined toward the left side as shown in FIG. 9, the beam irradiated from the LED 123 is reflected to the first and second photo detectors 121 and 122, with the first photo detector 122 receiving a larger amount of the reflected beam. The differential amplifier 124 outputs a positive value for the summed result. Based upon the summed result, the disk drive apparatus 100 identifies the disk cartridge 10 mounted in the disk drive apparatus 100 as a C-type disk, which is identified by having the reflection portions 13f inclined toward the left side for the identification mark.

Since the amount of the beam reflected from the reflection portions is changed by changing the material, size, or color of the reflection portion, a larger number of combinations can be formed.

Figure 10:
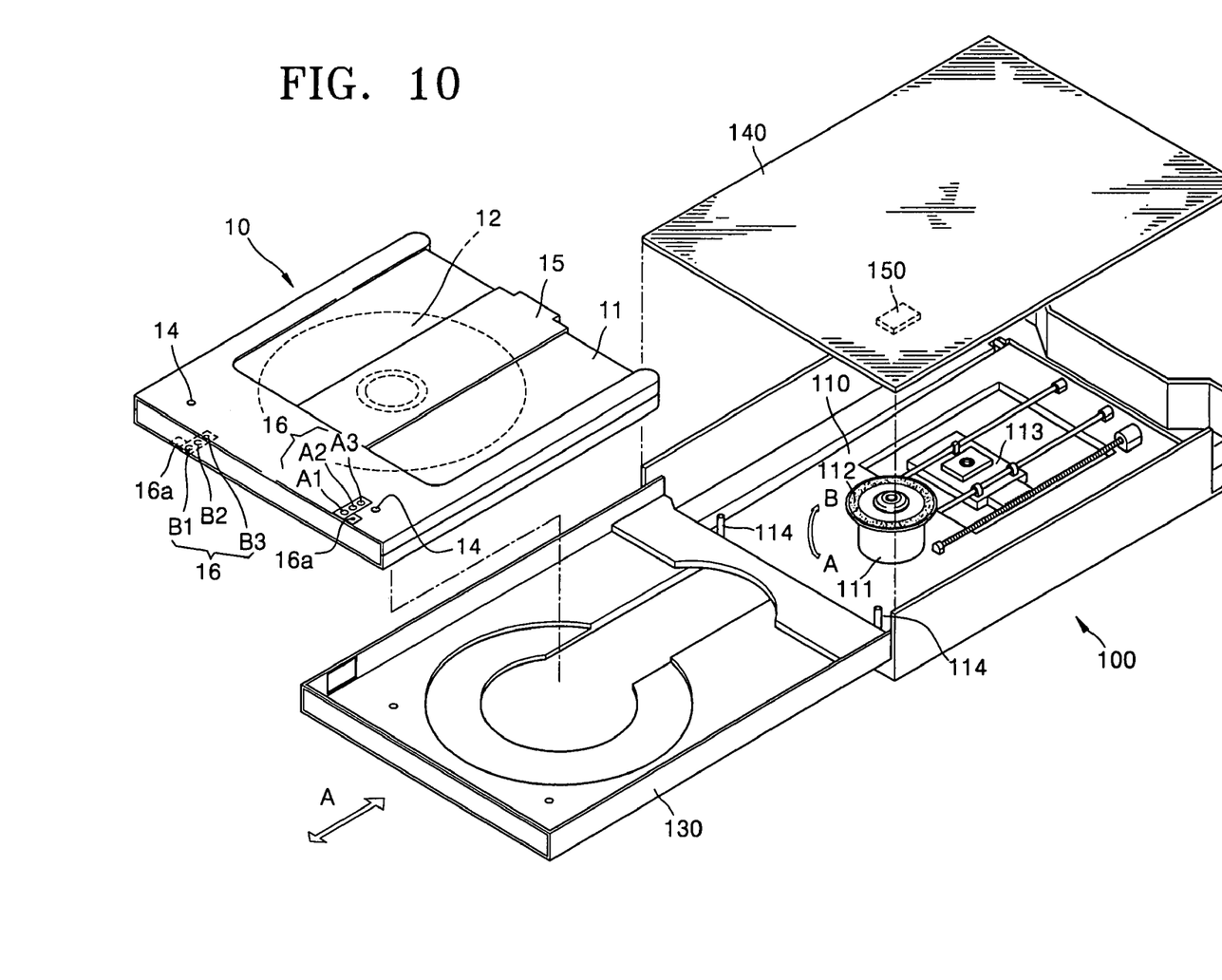
FIG. 10 is a perspective view illustrating a disk cartridge and disk drive apparatus having a disk identification device according to a further embodiment of the present invention.
Figure 11A:
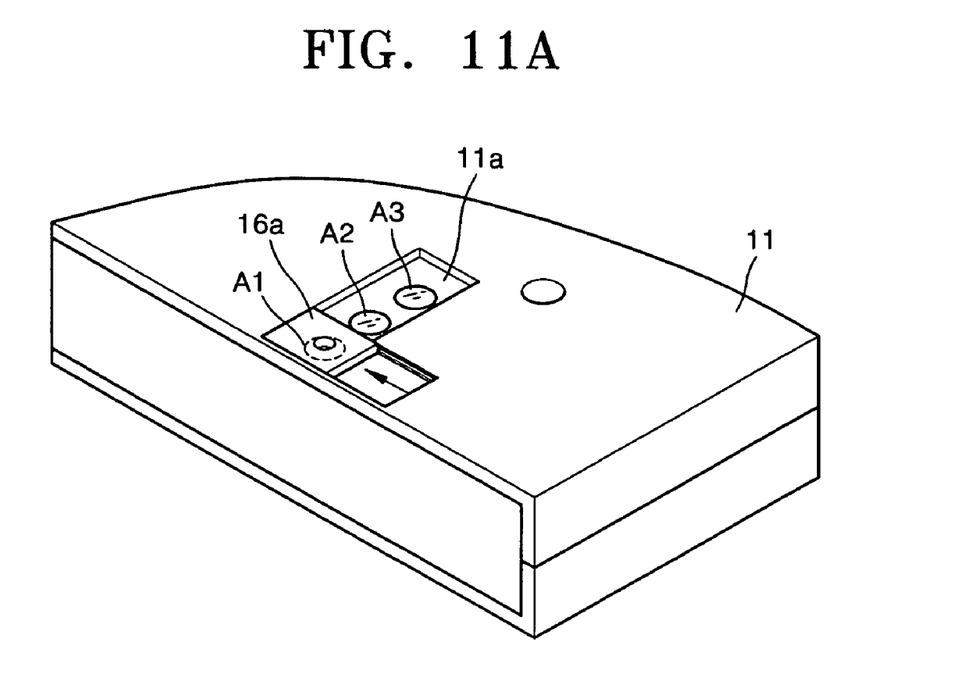
FIGS. 11A and 11B are enlarged perspective views illustrating a principal portion of the disk cartridge of FIG. 10.
Figure 11B:
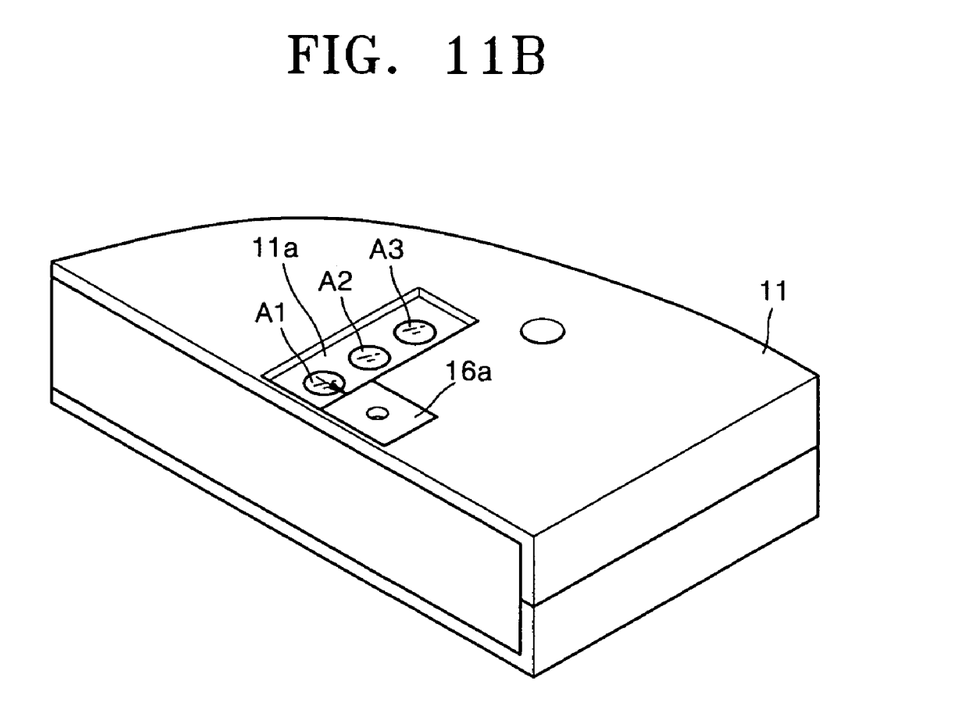
Figure 12:
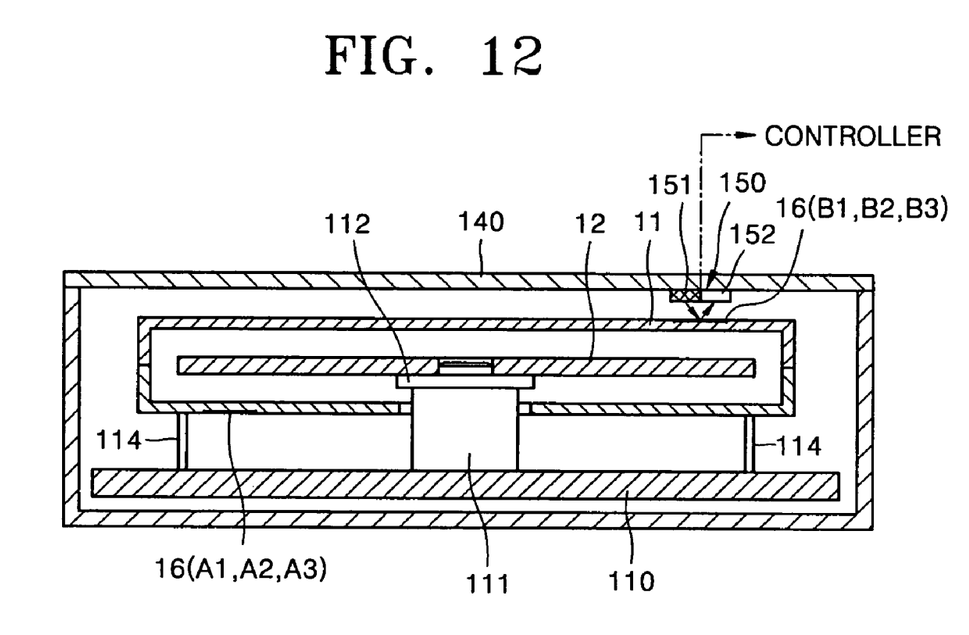
FIG. 12 is a cross-sectional view illustrating an example of the disk identification device of FIG. 10.

FIGS. 10 through 12 illustrate the disk cartridge 10 and the disk drive apparatus 100 having a disk identification device according to an additional embodiment of the present invention. As shown in FIGS. 10 through 12, the case 11, which receives the disk 12, has reflection portions 16 including a plurality of reflectors A1, A2, A3, B1, B2, and B3. The reflectors A1, A2, A3, B1, B2, and B3 are located in groove portions 11a, which are recessed into sides of the case 11 to prevent scratches on the reflectors A1, A2, A3, B1, B2, and B3.

In the shown example, the reflectors A1, A2, A3, B1, B2, and B3 are formed by attaching or printing a label that reflects a beam, or coating a reflection film formed of aluminum or other reflective material. The color, material, or area of the reflectors A1, A2, A3, B1, B2, and B3 is varied so as to change the amount of the beam reflected from the reflectors A1, A2, A3, B1, B2, and B3, so that the disk type of the disk 12 is identified.

Specifically, the disk type of the disk 12 can be identified by combining signals obtained from the reflectors A1, A2, A3, B1, B2, and B3. In the shown embodiment, the reflectors A1 and B1 are used for identifying the recordability of the disk 12. The recordability is indicated by sliding opening/closing members 16a for the corresponding reflectors A1 and B1 on the case 11. When the opening/closing member 16a covers the reflector A1 as shown in FIG. 11A, the amount of the reflected beam decreases. When the opening/closing member 16a uncovers the reflector A1 as shown in FIG. 11B, the amount of the reflected beam increases. By using the difference in the amounts of the reflected beams, the recordability of the disk 12 can be identified.

The shown reflectors A2 and B2 are used to distinguish a state of the surface of the disk 12 which faces an optical pickup between an operation surface and a non-operation surface. In the shown embodiment, the operation surface or non-operation surface of the disk 12 can be identified based on the amount of the beam reflected from the reflectors A2 and B2.

The reflectors A3 and B3 are used for identifying the capacity of the disk 12.

When the cartridge 10 according to the embodiment of the present invention shown in FIGS. 10 through 12 is loaded in the disk drive apparatus 100, an optical detector 150 irradiates the beam to the corresponding reflection portion 16 to detect the beam reflected from the reflectors A1, A2, A3, or B1, B2, and B3 as shown in FIG. 12. In the shown example, the optical detector 150 is installed on a cover 140 of the disk drive apparatus 100 while including an LED 151 and a photo detector 152. If high amounts of beams are reflected from the reflectors A1, A2, and A3, a controller 200 identifies the state of the loaded disk as a high density disk and the operation surface faces the optical pickup 113. If the cartridge 10 is loaded in a reverse state to reflect high, low, and high amounts of beams from the reflectors B1, B2, and B3, the controller 200 identifies the state of the loaded disk as the high density disk and the non-operation surface faces the optical pickup 113. Accordingly, the controller 200 outputs a load error signal. Although the present embodiment illustrates the optical detector 150 installed on the cover 140 to detect the reflection portion 16 on the upper surface of the cartridge 10, the optical detector 150 may be installed on a rotation chassis 110 to detect the reflection portion 16 on the lower surface of the cartridge 10.

Figure 13:
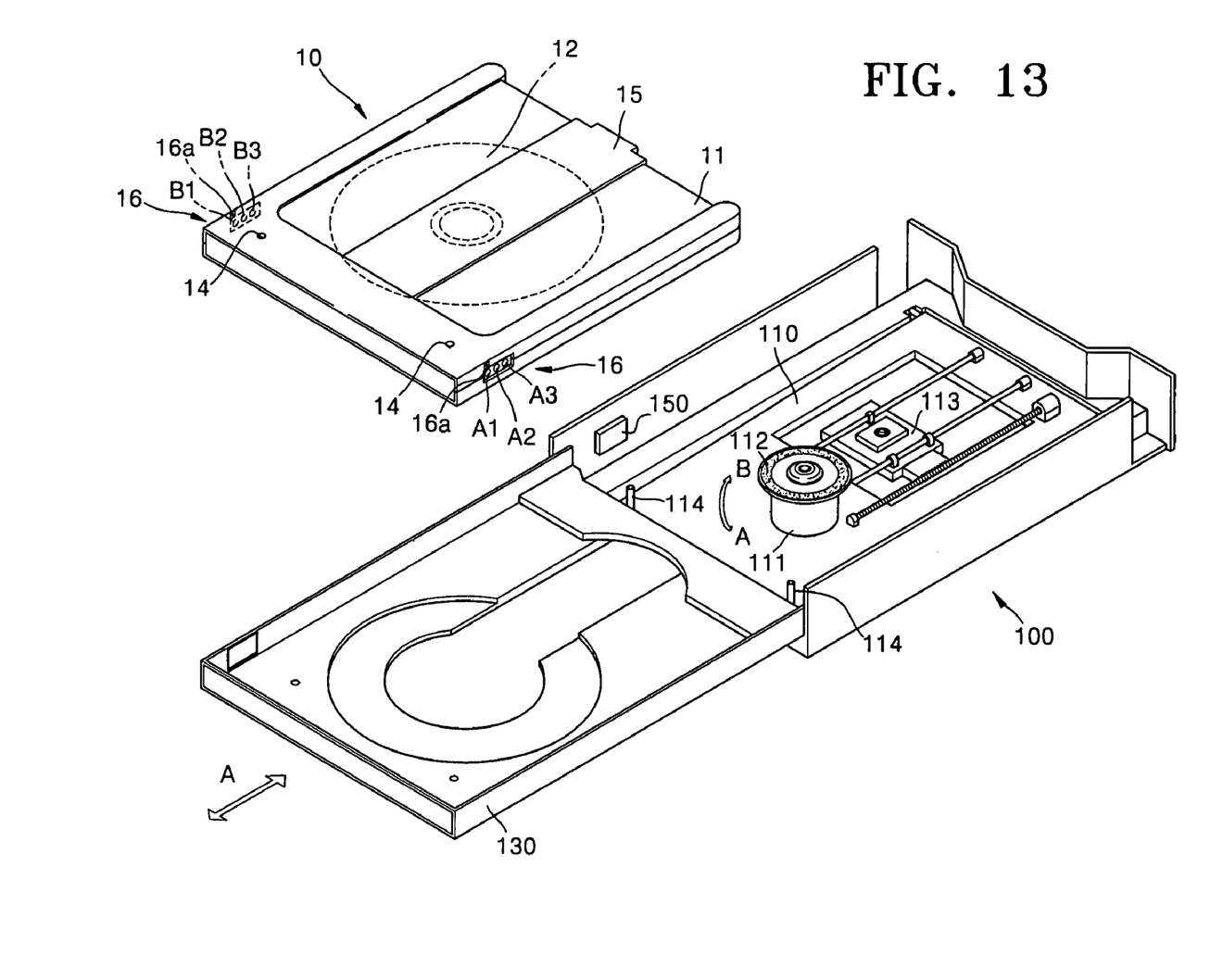
FIG. 13 is a perspective view illustrating a disk cartridge and disk drive apparatus having a disk identification device according to an additional embodiment of the present invention.
Figure 14:
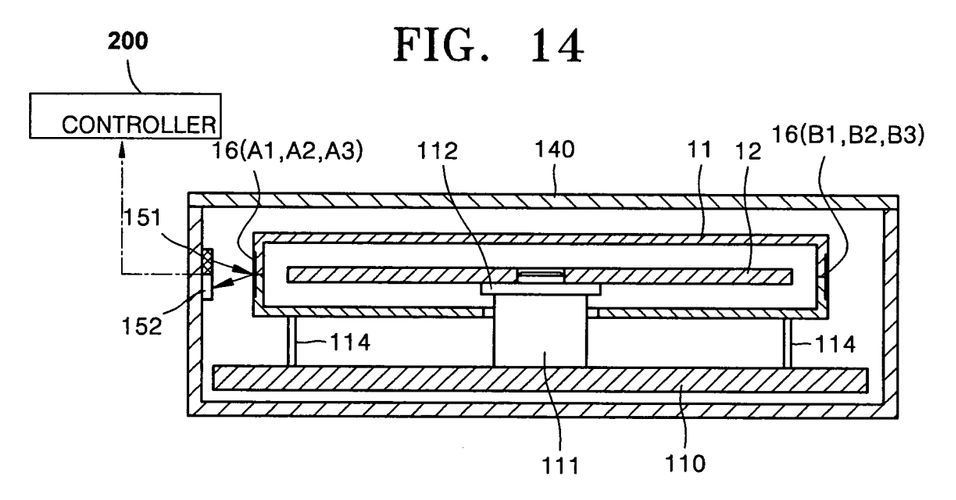
FIG. 14 is a cross-sectional view illustrating an example of the disk identification device of FIG. 13.

FIGS. 13 and 14 illustrate the disk cartridge 10 and the disk drive apparatus 100 having a disk identification device according to a yet further embodiment of the present invention. The same reference numerals in FIGS. 13 and 14 denote the same components used in the embodiment shown in FIGS. 10 through 12. The general construction of the disk cartridge 10 and the disk drive apparatus 100 according to the embodiment shown in FIGS. 13 and 14 is generally the same as those of the embodiment shown in FIGS. 10 through 12, except that the reflection portions 16 and the optical detector 150 are respectively installed on sides of the disk cartridge 10 and the disk drive apparatus 100.

When the cartridge 10 is loaded in the disk drive apparatus 100, the optical detector 150 including the LED 151 and the photo detector 152 irradiates a beam to the corresponding reflection portion 16 to detect the beam reflected from reflectors A1, A2, A3, or B1, B2, and B3 as shown in FIG. 13. If high amounts of beams are reflected from the reflectors A1, A2, and A3, the controller 200 identifies the state of the loaded disk as a high density disk and an operation surface faces an optical pickup 113. If the cartridge 10 is loaded in a reverse state to reflect high, low, and high amounts of beams from the reflectors B1, B2, and B3, the controller 200 identifies the state of the loaded disk as the high density disk and a non-operation surface faces the optical pickup 113. Accordingly, the controller outputs a load error signal.

The above-described disk cartridge and disk drive apparatus according to the present invention provide identification marks to identify the kinds of the disks by varying the angle, amount, and/or the optical characteristics of the beam reflected from the reflection portion on the disk cartridge. Therefore, the disk types are identified and distinguished by a simple structure in which the optical detector detects the reflected beam.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disk cartridge for use with a disk as an information recording medium and which is received in a recording and/or reproducing apparatus having an optical detector, the disk cartridge comprising:
 a case which receives the disk; and
 a reflection portion disposed on the case, which reflects an incident beam to the optical detector to identify a disk type of the disk in the case according to a characteristic of the reflected beam,
 wherein the reflection portion comprises a plurality of reflectors arranged along a row in a recess portion on the case, each reflector conveying a corresponding portion of an identification code used to detect the disk type; and a movable lid arranged to cover a selected reflector to adjust the characteristic of the reflected beam.

2. A disk cartridge to hold a disk, comprising:
 a case into which a disk is received; and
 a reflection unit disposed on a surface of the case and from which an incident beam is reflected,
 wherein the reflection unit imparts an optical property into the reflected beam which corresponds to the disk type of the disk in the case and distinguishes the disk type from additional disk types having corresponding other optical properties imparted by the reflection units associated with the additional disk types, and
 wherein the reflection unit is provided with a plurality of reflectors arranged in a recess portion on the case, and a movable lid arranged to cover a selected reflector to adjust the optical property of the reflected beam.

3. The disk cartridge of claim 2, wherein the reflection unit comprises a reflection surface disposed at one of a predetermined set of angles relative to the surface of the case, and the one angle corresponds to the disk type of the disk in the case with the additional disk types having corresponding other angles.

4. The disk cartridge of claim 2, wherein the imparted optical property differentiates a high density disk from a low density disk.

5. The disk cartridge of claim 2, wherein the imparted optical property differentiates an operational side of the disk from a non-operational side of the disk.

6. The disk cartridge of claim 2, wherein the imparted optical property indicates whether the disk is a write-protected disk or a disk which is not write protected.

7. The disk cartridge of claim 6, wherein the movable lid is moveable across the reflection unit to change the disk between the write-protected disk and the disk which is not write protected.

8. A disk cartridge to hold a disk, comprising:
 a case into which a disk is received; and a reflection unit disposed on a surface of the case and from which an incident beam is reflected, wherein the reflection unit imparts an optical property into the reflected beam which corresponds to the disk type of the disk in the case, wherein the reflection unit alters a wavelength of the beam to be one of a predetermined set of wavelengths, and the one wavelength corresponds to the disk type of the disk in the case, and wherein the reflection unit is provided with a plurality of reflectors arranged in a recess portion on the case, and a movable lid arranged to cover a selected reflector to adjust the optical property of the reflected beam.

9. The disk cartridge of claim 8, wherein the reflection unit alters the wavelength of the beam to be one of a predetermined set of colors, and the one color corresponds to the disk type of the disk in the case.

10. A disk cartridge to hold a disk, comprising:

a case into which a disk is received; and a reflection unit disposed on a surface of the case and from which an incident beam is reflected, wherein the reflection unit imparts an optical property into the reflected beam which corresponds to the disk type of the disk in the case, wherein the reflection unit comprises a reflection surface having one of a predetermined set of reflection areas, and the one reflection area corresponds to the disk type of the disk in the case, and wherein the reflection unit is provided with reflection areas arranged in a recess portion on the case, and a movable lid arranged to cover a reflection area to adjust the optical property of the reflected beam.

11. The disk cartridge of claim 10, wherein the movable lid is selectively moved across the one reflection area so as to change an exposed portion of the reflection area such that a remaining amount of the area is the one reflection area.

12. A disk cartridge for use with a disk as an information recording medium and which is received in a recording and/or reproducing apparatus having an optical detector, the disk cartridge comprising:

a case which receives the disk; and a reflection portion disposed on the case and which reflects an incident beam to the optical detector for identifying a disk type of the disk in the case according to a characteristic of the reflected beam, the reflection portion comprising reflectors arranged to be read sequentially with each reflector conveying a corresponding portion of an identification code used to detect the disk type, and a movable lid arranged to partially open or close part of a selected reflector to adjust the characteristic of the reflected beam.

13. The disk cartridge of claim 12, wherein each reflector alters the light beam so as to convey the corresponding portion of the identification code.

14. The disk cartridge of claim 13, wherein at least one of the reflectors has one of a predetermined number of angles relative to the light beam so as to alter the light beam, with each angle conveying a distinct piece of information in the reflected light beam for use as the corresponding portion of the identification code.

15. The disk cartridge of claim 13, wherein at least one of the reflectors selectively alters a wavelength of the light beam, with an amount of the altered wavelength conveying a distinct piece of information in the reflected light beam for use as the corresponding portion of the identification code.

16. The disk cartridge of claim 15, wherein the at least one reflector alters a color of the light beam, with an amount of the altered color conveying the distinct piece of information in the reflected light beam for use as the corresponding portion of the identification code.

17. The disk cartridge of claim 13, wherein at least one of the reflectors has a corresponding area selected from a corresponding number of predetermined areas so as to alter an amount of the reflected light beam, with the amount of the reflected light beam conveying a distinct piece of information in the reflected light beam for use as the corresponding portion of the identification code.

* * * * *